United States Patent
Chatterjee et al.

(10) Patent No.: US 10,726,093 B2
(45) Date of Patent: Jul. 28, 2020

(54) REROUTING TO AN INTERMEDIATE LANDING PAGE

(71) Applicant: Microsoft Technology Licensing, LLC, Redmond, WA (US)

(72) Inventors: Shaunak Chatterjee, Sunnyvale, CA (US); Ravi Kiran Holur Vijay, Mountain View, CA (US); Romer E. Rosales, Burlingame, CA (US); Mohamed Gamal Mohamed Mahmoud, Santa Clara, CA (US); Zheng Li, San Jose, CA (US); Kwei-you Tao, San Francisco, CA (US); Bee-Chung Chen, San Jose, CA (US); Deepak Agarwal, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 896 days.

(21) Appl. No.: 15/199,440

(22) Filed: Jun. 30, 2016

(65) Prior Publication Data

US 2018/0004753 A1 Jan. 4, 2018

(51) Int. Cl.
| | |
|---|---|
| G06F 16/00 | (2019.01) |
| G06F 16/957 | (2019.01) |
| H04L 29/08 | (2006.01) |
| G06F 16/955 | (2019.01) |
| G06Q 50/00 | (2012.01) |
| G06Q 10/10 | (2012.01) |

(52) U.S. Cl.
CPC ........ *G06F 16/9574* (2019.01); *G06F 16/955* (2019.01); *G06Q 10/107* (2013.01); *G06Q 50/01* (2013.01); *H04L 67/02* (2013.01); *H04L 67/22* (2013.01)

(58) Field of Classification Search
CPC .................................................. G06F 16/9574
USPC ......................................................... 707/728
See application file for complete search history.

(56) References Cited

U.S. PATENT DOCUMENTS

| | | | | |
|---|---|---|---|---|
| 2009/0171755 | A1* | 7/2009 | Kane | G06Q 30/0214 705/14.16 |
| 2012/0030014 | A1* | 2/2012 | Brunsman | G06Q 30/0251 705/14.49 |
| 2013/0159233 | A1* | 6/2013 | Mason | G06F 16/951 706/45 |
| 2014/0129733 | A1* | 5/2014 | Klais | H04L 45/22 709/239 |

* cited by examiner

*Primary Examiner* — Chelcie L Daye
(74) *Attorney, Agent, or Firm* — Schwegman Lundberg & Woessner, P.A.

(57) ABSTRACT

A system and method for intermediate landing page rerouting are provided. In example embodiments, determine whether a webpage associated with a hyperlink has corresponding social network activities. Extract content from the webpage determined to have corresponding social network activities. In response to a selection of the hyperlink, reroute a web browser to an intermediate landing page. Cause presentation, at a user interface, of the extracted content and the corresponding social network activities.

20 Claims, 7 Drawing Sheets

US 10,726,093 B2

REROUTING TO AN INTERMEDIATE LANDING PAGE

TECHNICAL FIELD

Embodiments of the present disclosure relate generally to uniform resource locator routing and, more particularly, but not by way of limitation, to rerouting to an intermediate landing page.

BACKGROUND

Various internee communication channels are used by social network providers to interact, engage, and update members with relevant information associated with their network. Such communication channels include email, push notification, an activity feed, and the like. The activity teed is a webpage that displays activities of other members within the user's network in an event based timeline, the event being filtered by member interest, timing of the activity, the type of activity, and the like. Thus, the activity feed webpage is the center of content presentation to the user and updates the user of content and activities surrounding their professional social network.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
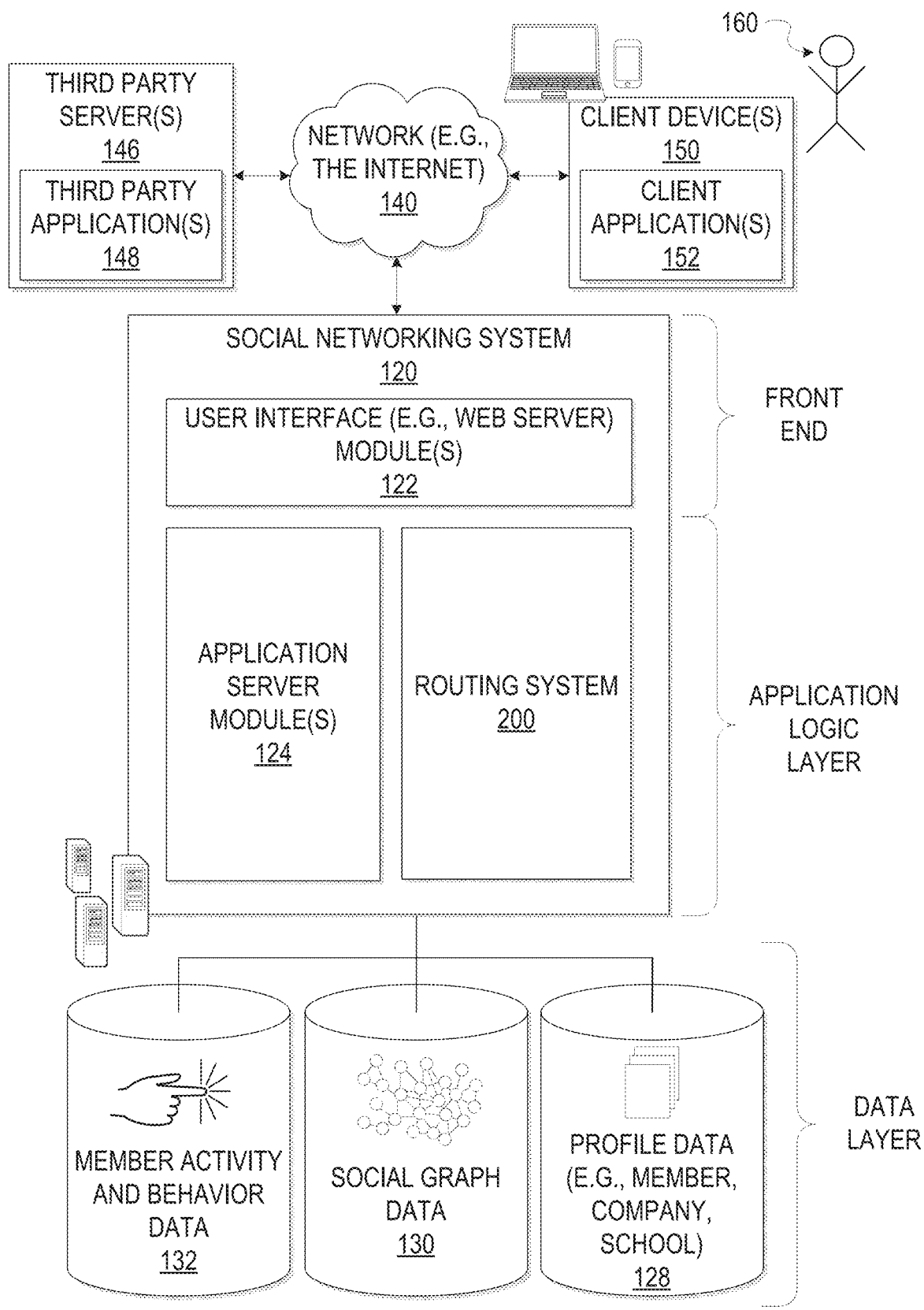
FIG. 1 is a network diagram depicting a client-server system within which various example embodiments may be deployed.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In addition to the activity feed of a social network, email is another communication channel that a social network utilizes to interact directly with members outside of the social network application platform. Vital information relevant to the user is often sent through such a communication channel to directly send information to the user. Often, emails contain links that route users directly to a webpage for further content presentation and interaction with the user. Therefore, the links included within the email directs the user from an interface platform outside of the social network to a different platform within the social network. However, such direct routing to the webpage is isolated from the activity feed webpage such that when the user finishes consuming the content on the directed webpage, the user is required to take additional action to be routed back to the activity feed, if at all. Such a direct routing segregates the user experience from the rest of the activity feed webpage.

Conventionally, when a user is sent communication via email with selectable items, each selectable item is associated with a uniform resource locator (URL) link that directly routes the user to the webpage where the content is presented. In some cases, such a direct routing is not preferable, especially where there are social activities associated with the directly linked webpage including commenting, liking, and sharing of the article by other members within the user's network. In such instances, this information is similarly vital as the content contained within the directly linked webpage itself.

In various embodiments, a system routes a web browser to an intermediate landing page, in response to an item selection, where the intermediate landing page presents content extracted from the webpage corresponding to the item selection. The system determines that the web browser should be re-routed to the intermediate landing page in response to a determination that the selected content has associated social network information relevant to a user. The routing system determines that there exist activities within a user's social network associated with the directly linked webpage. Based on the determination of social network activities, the routing system reroutes the user to an intermediate landing page (e.g., such as the activity feed webpage), where vital content of the directly linked webpage is presented and located at the top of the intermediate landing page, according to example embodiments. In other words, when the condition for rerouting is triggered (e.g., where there are activities within the user's social network associated with the directly linked webpage), in response to a hyperlink selection, the system reroutes from the directly linked webpage to the intermediate landing page. Activities within the user's social network associated with the directly linked webpage are also presented in addition to the vital content.

It is noted that although user interaction with email is used as an example for user selection of a selectable item with an associated URL, the term is used in its broadest sense and therefore includes all user interaction with other communication channels such as push notifications, SMS (short message service), IM (instant messaging), and the like. Similar to email, other communication channels also contain selectable items with associated URL with direct links to a webpage. Further, web browser and web pages are used herein are one example embodiments. It is noted that the current rerouting expands beyond web browsers and web pages but to mobile applications and other forms of electronic content display format.

As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, Application Programming Interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone). For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1, social networking system 120 may include a routing system 200, which is described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
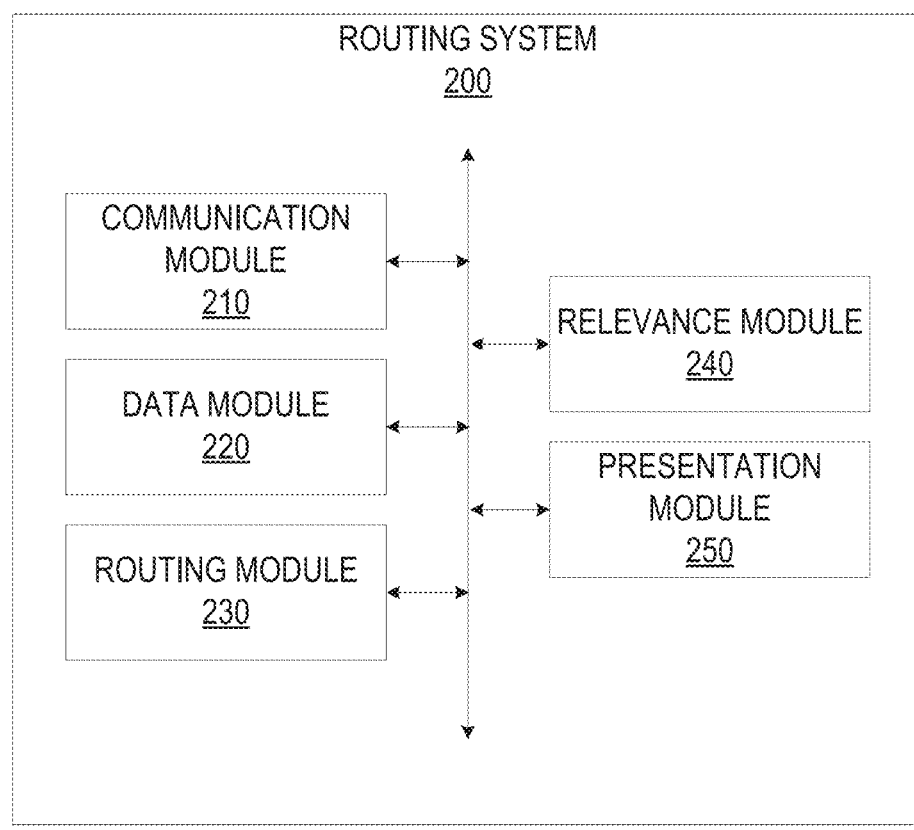
FIG. 2 is a block diagram illustrating an example embodiment of a routing system, according to some example embodiments.

FIG. 2 is a block diagram illustrating components provided within the routing system 200, according to some example embodiments. The routing system 200 includes a communication module 210, a data module 220, a routing module 230, a relevance module 240, and a presentation module 250. All, or some, of the modules are configured to communicate with each other, for example, via a network coupling, shared memory, a bus, a switch, and the like. It will be appreciated that each module may be implemented as a single module, combined into other modules, or further subdivided into multiple modules. Any one or more of the modules described herein may be implemented using hardware (e.g., a processor of a machine) or a combination of hardware and software. Other modules not pertinent to example embodiments may also be included, but are not shown.

The communication module 210 is configured to perform various communication functions to facilitate the functionality described herein. For example, the communication module 210 may communicate with the social networking system 120 via the network 140 using a wired or wireless connection. The communication module 210 may also provide various web services functions such as retrieving information from the third party servers 146 and the social networking system 120. In this way, the communication module 220 facilitates the communication between the routing system 200 with the client devices 150 and the third party servers 146 via the network 140. Information retrieved by the communication module 210 may include profile data corresponding to the user 160 and other members of the social network service from the social networking system 120.

The data module 220 is configured to provide various data functionality such as accessing, exchanging, and storing information with databases or servers. For example, data module 220 may store and access member data from various databases including member activity and behavior data 132, social graph data 130, and profile data 138. In an example, the data module 210 stores member activities in database 132. For instance, where member activities include comments, likes, share, recommendations of an article, those activities are stored in association to the article and the member profile itself that has the user activity. Further, the data module 220 may also extract attributes and/or characteristics from the profile data of member profiles. The data module 220 continuously updates the relevant social network information surrounding the linked webpage such that where relevant social network information is presented, the rerouting from a linked webpage to an intermediate landing page is triggered. Further, where the user is viewing the content within an intermediate landing page, as the data module 220 continuously updates the database with current information of social network activities, those newly updated activities are also presented in real time to the user. In some example embodiments, the data module 220 may exchange information with third party servers 146, client devices 150, and other sources of information.

The routing module 230 is configured to reroute a web browser to an intermediate landing page, in response to a selection of a hyperlink. The routing module 230 determines whether a webpage associated with the hyperlink has corresponding social network activities. Users are sent communication via email, instant message (IM), short message service (SMS), push notifications, and the like. These communications have selectable interfaces that route to corresponding webpages for full content presentation. The routing module 230 determines whether the webpages for each associated link have corresponding social network activities by accessing databases 132, 130, and 128 to determine whether any member within the user's network have an activity associated with the webpage. A user's network activity may include a member within the user's network liking, commenting, posting, or sharing the content associated with the webpage. In one instance, the webpage is an article and a user's network activity would include a member within the user's network sharing that article. Details regarding rerouting and member activities are described in detail in associated with FIG. 5 and FIG. 6.

The routing module 230 extracts content from the webpage determined to have corresponding social network activities. Such extracted content include extracting important information including the first picture in the article, the title, the first few lines of the webpage, a summary within the metadata file associated with the webpage, comments written about the article by a member of the user's social network, and the like. Further, the user's social network activities corresponding to the webpage are also extracted. These network activities include a member within the user's network liking, commenting, posting, or sharing the content associated with the webpage. The user's social network activities may include the activities of members directly within the user's network or a secondary connection (e.g., a member that is connected to a member that is directly within the user's network). The routing module 230 maps the extracted webpage content and network activities to the hyperlink associated with the webpage.

In response to a user selection of a hyperlink associated with the webpage, and based on the determination that the webpage has corresponding social network activities, the routing module 230 reroutes the web browser to an intermediate landing page and not directly to the webpage itself.

Thus, under the correct conditions, the routing module 230 reroutes the web browser from the linked webpage, where the linked webpage is isolated from various social network activities, to an intermediate landing page that includes various relevant social network activities. Where the webpage has no corresponding social network activities, then the routing module 230 does not reroute to the intermediate landing page, but directs the web browser directly to the webpage itself. In instances where there are no corresponding social network activities, the content is best presented with the direct webpage information. Whereas in instances where there are corresponding social network activities, such network activities are similarly vital and thus the web browser is rerouted in order to present such network activity information in the context of a feed landing page. The extracted webpage content and corresponding social network activities are then caused to be presented at the intermediate landing page.

In some embodiments, the extracted webpage content and corresponding social network activities are located at the top position of the intermediate landing page. Further, the extracted webpage content is highlighted to show that the top item is the selected content. The highlighting comes in the form of calling attention to the extracted content including using a different text font, text size, text color, a different look for the surrounding areas of the extracted content such as different background, and the like. In some embodiments, the highlighting serves to differentiate the extracted content from the remaining content item below the extracted content. Where the user returns to the feed activity page after leaving the page, the highlighting is no longer applied to the extracted content. The intermediate landing page is a webpage activity feed that displays activities of other members within the user's network in an event based timeline, the event being filtered by member interest, timing of the activity, the type of activity, and the like. In the instance of the rerouting, the event is the extracted webpage content and corresponding social network activities. Details regarding rerouting and member activities are described in detail in associated with FIG. 5 and FIG. 6. In other embodiments, the extracted webpage content may be placed in other relevant locations that is not the top position. For instance, it may be placed next to a similar activity within the intermediate landing page, where the intermediate landing page is filtered by time relevance (e.g., the more recent activities are placed on top). Other types of filtering can apply as well as noted herein.

In various embodiments, the hyperlink that the user selects has a first URL and the rerouted intermediate landing page is associated with a second URL. This further allows the user to see from the URL that there has been a rerouting. The routing module 230 maps the first URL of the original hyperlink to the extracted webpage content of the intermediate landing page. Subsequently, where the user selects the presented extracted webpage content, the web browser then routes the web browser to the webpage content. In this example, the user has the dual benefit of being presented the social network activities surrounding the webpage content in addition to being allowed the original option of being directed to the webpage itself.

In various embodiments, the relevance module 240 reranks the remaining content items in the intermediate landing page according to the relevance of the remaining content item to the extracted content positioned at the top of the intermediate landing page. The intermediate landing page presents an activity feed that displays activities of other members within the user's network in an event based timeline, the event being filtered by member interest, timing of the activity, the type of activity, and the like. The activity feed in this instance include the extracted content presented at the top of the page. Since the activity feed gathers activities from database 132, 130, and 128 to display on the intermediate landing page. These activities (e.g., referred to as content items) are presented in an ordered format and ranked according to the extracted content located at the top. Each activity has associated metadata indicating the category of activity, the associated social activities surrounding the activity (e.g., the members within the social network who has liked, commented, shared the activity, and the like), the date, and the like.

In some embodiments, determining relevance is based on past user engagement with the activities being presented on the activity feed page. Past user engagement comes in the form of the user taking some action to indicate interest with an activity such as clicking on the activity for further information, responding to the activity such as commenting, liking, sharing the activity, and the like. In an example, activities are stored within categories, including tending now, innovations, technical, expanding connections (activities that result in the user increasing their direct social network), and the like. Past user engagement statistics can show that 60% of the time, the user engages in activities within the category of expanding connections, and therefore, the activities on the feed page that are within the category of expanding connections are assigned more weight and thus ranked higher within the feed page.

In some embodiments, the activities are weighted and ranked using a point based system to determine relevance, where the larger the assigned points, the more relevant the activity. For instance, where the activity has corresponding social network activity of the user's network, then the activity is assigned a point for each corresponding social network activity of the user's network. A point is also assigned for the activity being in the same category as the extracted content presented at the top of the intermediate landing page. Further, another point is also assigned to the activity that relates to search content of the user (e.g., search content the user has searched for and engaged with), articles that the user has read, job posts that the user clicked on, and the like. Additionally, another point is also assigned to activities that the user is likely to engage with, user engagement being determined based on past engagements with similar activities. User engagement can be in the form of an activity being presented to the user and eliciting a response from the user such as clicking on the activity. Furthermore, these activities being presented below the top extracted content are filtered within a specific time range. The time range is predetermined and can be set to within a current search session (near real-time) or a wider range, such as within the last week of activities.

Figure 5:
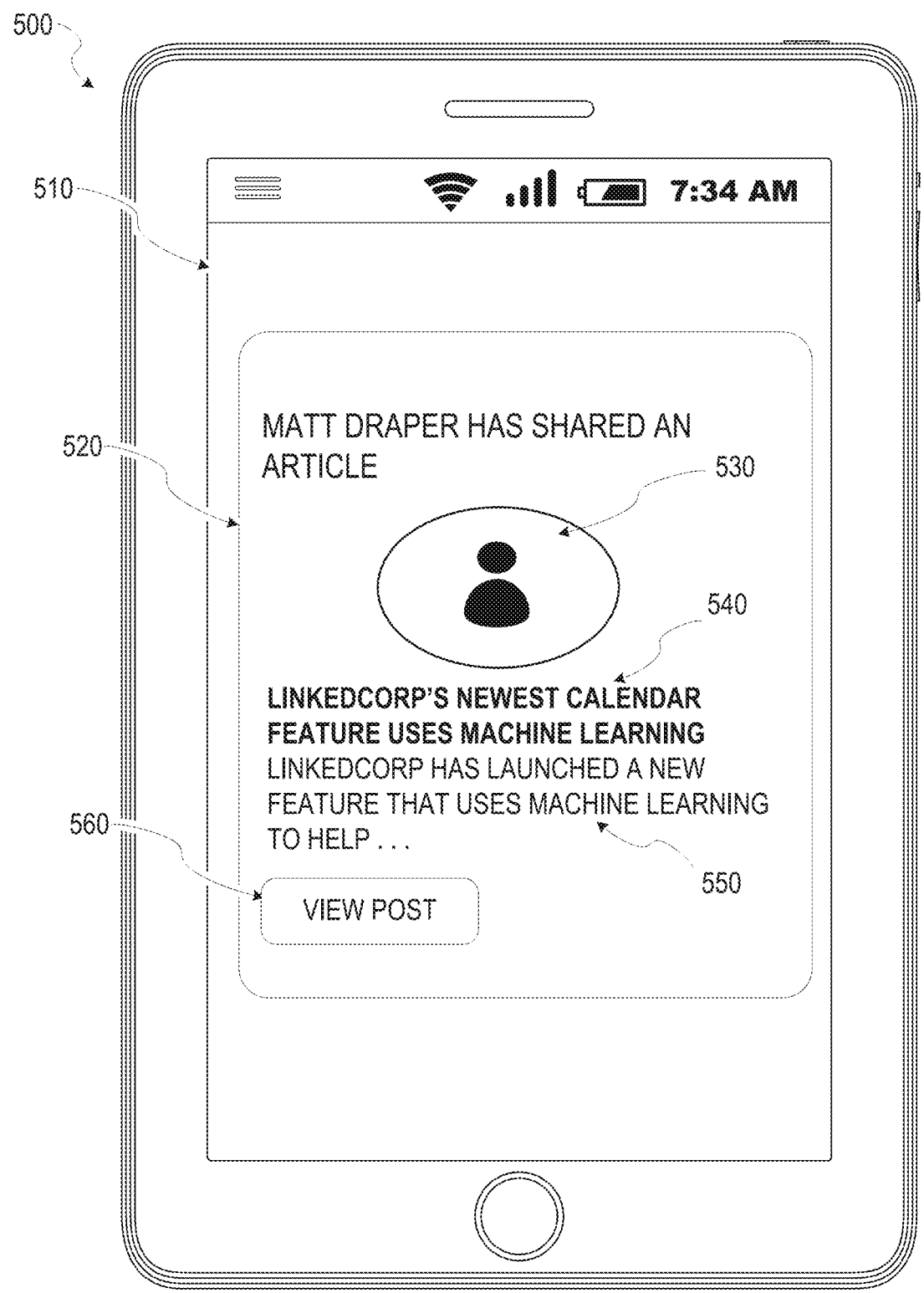
FIG. 5 is an example user interface for interactively presenting the a notification, according to some example embodiments.
Figure 6:
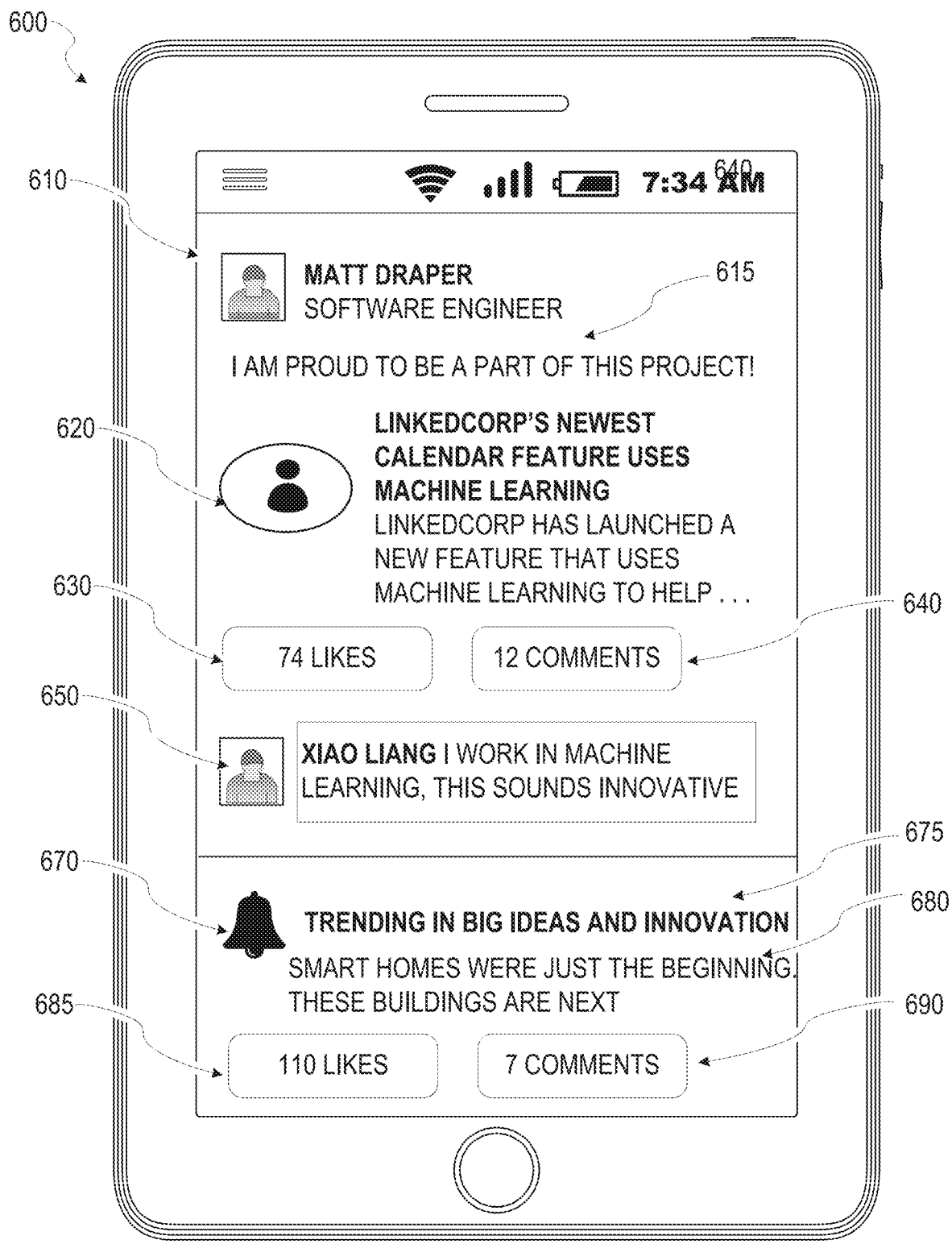
FIG. 6 is an example device displaying an example user interface for interactively presenting content at an intermediate landing page, according to some example embodiments.

In some implementations, the presentation module 250 is configured to cause presentation of communications to the user and present extracted content and remaining content items within the intermediate landing page. For instance, a user is presented a short notification of member activities including a shared article as depicted in FIG. 5. In another example, presentation of extracted content and remaining content are presented at a user interface at the intermediate landing page as depicted in FIG. 6. Further details associated with the presentation module 250, according to various example embodiments, are discussed below with respect to FIG. 5 and FIG. 6. In various implementations, the presentation module 250 presents or causes presentation of information (e.g., visually displaying information on a screen, acoustic output, haptic feedback). Interactively presenting information is intended to include the exchange of information between a particular device and the user of that device. The user of the device may provide input to interact with a user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 250 provides many other user interfaces to facilitate functionality described herein. Further, it will be appreciated that "presenting" as used herein is intended to include communicating information or instructions to a particular device that is operable to perform presentation based on the communicated information or instructions via the communication module 210, data module 220, routing module 230, and relevance module 240.

Figure 3:
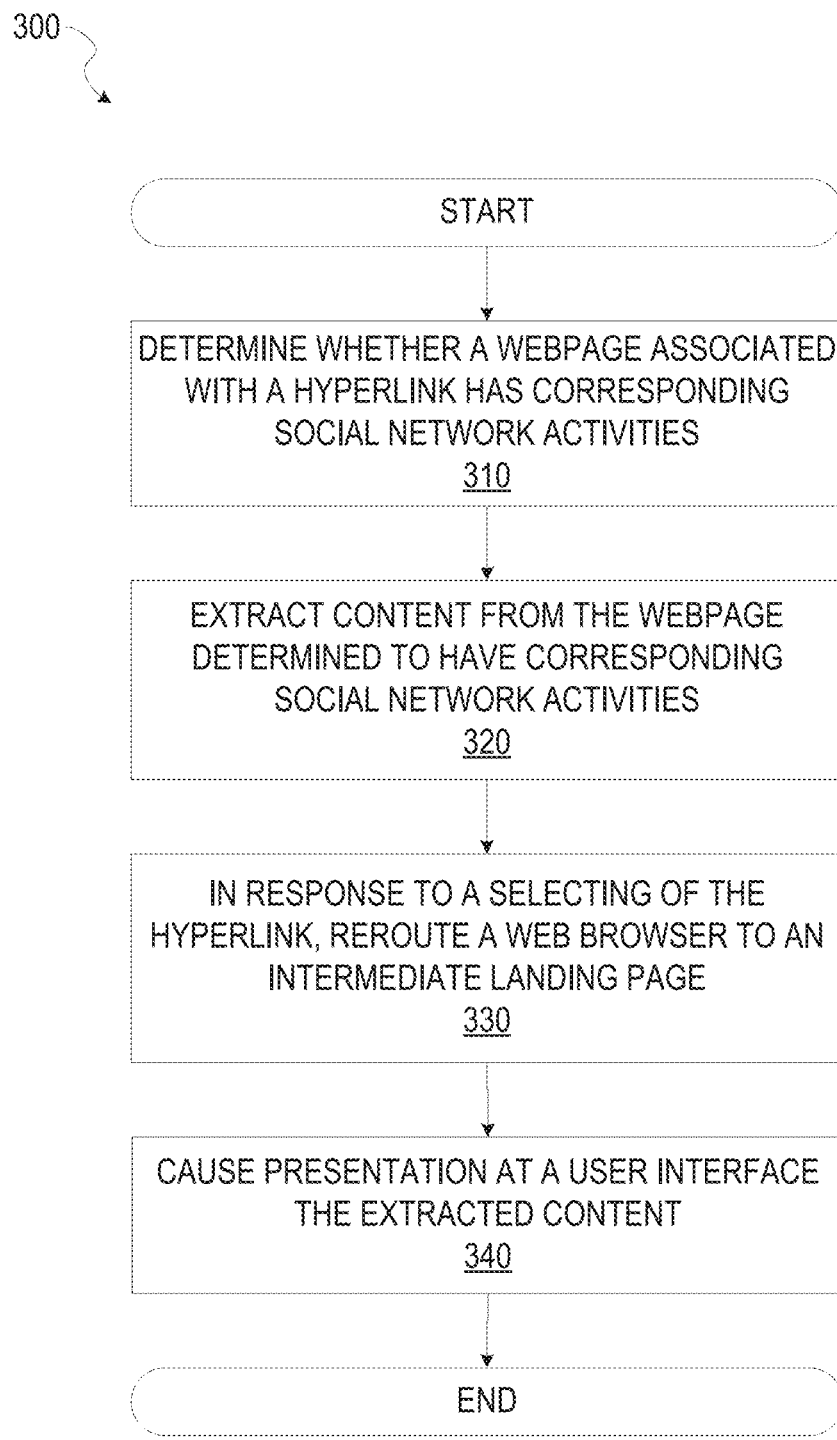
FIG. 3 is a flow diagram illustrating an example method for intermediate landing page rerouting, according to some example embodiments.

FIG. 3 is a flow diagram illustrating an example method 300 for intermediate landing page rerouting, according to example embodiments. The operations of the method 300 may be performed by components of the routing system 200. The system receives a first URL associated with the requested web page, identifies whether the requested web page has associated corresponding social activities. Where such corresponding social activities are identified, the content of the webpage is extracted and is placed as the top activity in the intermediate landing page. The intermediate landing page as an associated URL that is continuously updated with recent and relevant member activities accessed from database 128, 130, and 132. Where such corresponding social activities are identified, the content of the webpage is extracted and placed as the top activity on the intermediate landing page and remaining activities are ranked accordingly. In some embodiments, the remaining activities are ranked according to its relevance to the top activity, to past user engagement and the like.

At operation 310, the routing module 230 determines whether a webpage associated with a hyperlink has corresponding social network activities. In an example, as shown in FIG. 5, a selectable interface element 560 has associated hyperlink to view the article shared by a Matt Draper, a member within the user's social network. When Matt Draper shares an article, the user may receive a notification via a push notification, instant message (IM), short message service (SMS), email, or the like. The webpage associated with the selectable interface element hyperlink 560 is the article that has been shared. The routing module 230 determines whether the article associated with the selectable interface element hyperlink 560 has corresponding social network activities. The activities of members within the user's social network is accessed, via database 132, 130, and 128 to determine whether the user's first and secondary social network has activities associated with the article. Such activities include comments, likes, shares, recommendations, and the like of the article.

At operation 320, based on the determination that the webpage associated with the hyperlink indeed has corresponding social network activities, the routing module 230 extracts content from the webpage determined to have corresponding social network activities. In an example, referring to FIG. 6, the routing module 230 extracts content such as the image 620 from the web page, the title 624 of the article, and the first line 628 of the article. The routing module 230 further extracts social network activities corresponding to the web page. Such social network activities include comment 615 that the Matt Draper (e.g., a first connection within the user's network) wrote when sharing the article, total like 630 responses by other member's within the social network in response to the article that Matt Draper shared, total comment 640 responses by other member's within the social network in response to the article, important comments 650 by members within the user's network are shown out of the total comment 640. The total like 630, total comment 640, and important comments 650 are example forms of activities surrounding the user's social network, the activities being related to the linked webpage. These activities may be weighted differently, such that activities associated with members within a user's priority network may have more weight than other activities by members outside of the priority network. Such priority network may be colleagues of the user's current company, the company the user works for, members that the user actively follows, or members the user otherwise indicate to include in their priority network. Top weighted activities are subsequently presented on the intermediate landing page during rerouting. The database are continuously updated to reflect recent activities performed by the user's social network, such that the activities presented along with the content from the linked webpage are updated as new activities are detected from the user's network.

At operation 330, in response to a selection of the hyperlink, and the determination that the hyperlink has corresponding social network activities, the routing module 230 reroutes a web browser to an intermediate landing page. Referring back to FIG. 5, in response to a selection of the hyperlink within selectable interface element 560, the routing module 230 determines that the webpage associated with the hyperlink within the selectable interface element 560 does have corresponding social network activities, the routing module 230 reroutes the web browser to the intermediate landing page 610. This intermediate landing page 610 is an activity feed that displays activities of other members within the user's network in an event based timeline, the event may be filtered by member interest, timing of the activity, the type of activity, and the like. The intermediate landing page has a set URL that accesses and retrieves member activities and posts from database 132 to present to a user at the intermediate landing page. These retrieved member activities and posts are then ranked accordingly as fully described herein. The hyperlink corresponding to the webpage within the selectable interface element 560 has a set URL, that directs the browser to the destination webpage, stored within database 128, 130, and 132. Where the routing module 230 determines rerouting should be activated, the hyperlink URL is replaced with the intermediate landing page URL and the relevant member activities and posts are retrieved accordingly as fully described herein. The user may be notified that the link was redirected based on the way the top activity is presented at the intermediate landing page since the top activity is presented in a way that differentiates it from the remaining activities in the intermediate landing page as fully described in associated with the presentation module 250.

At operation 340, the presentation module 250 causes presentation at a user interface the extracted content and the corresponding social network activities. Referring back to FIG. 6, the extracted content presented includes the image 620, title 624, first line 628 and the corresponding social network activities include total like 630, total comment 640, and important comment 650 by members within the user's network are shown out of the total comment 640. In other embodiments, the most recent comments are shown if there are no comments within the user's direct network.

Figure 4:
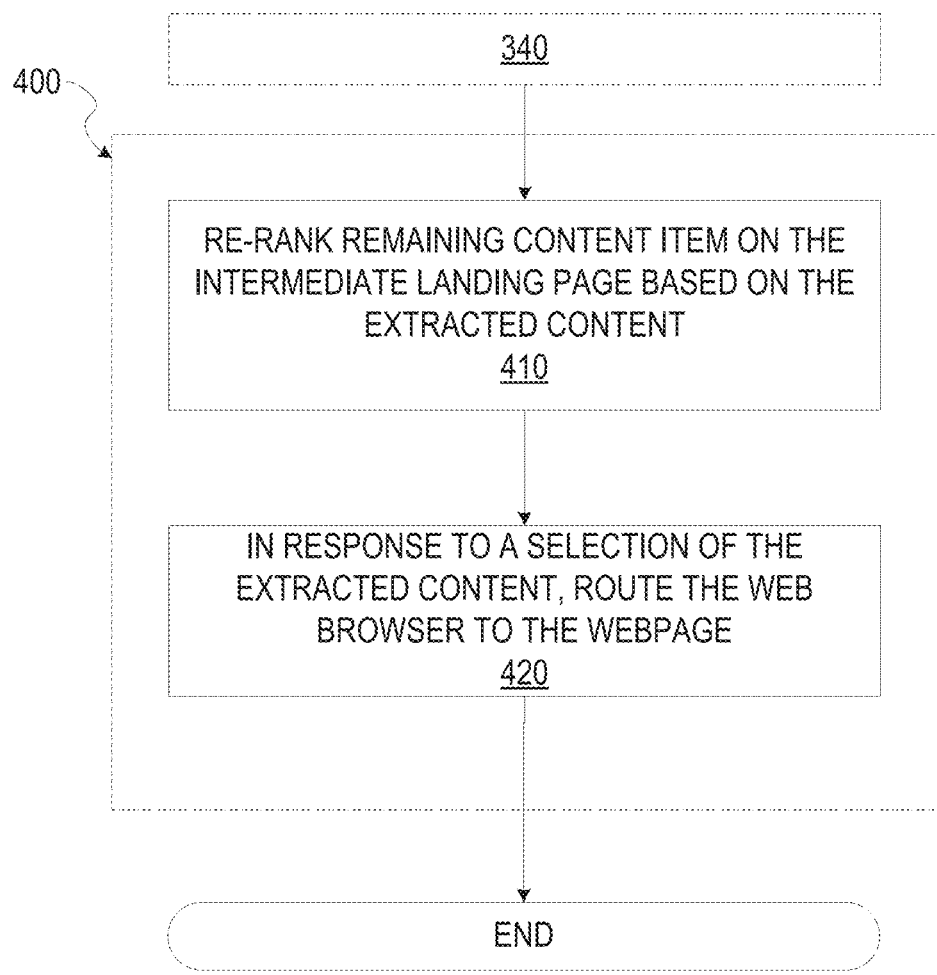
FIG. 4 is a flow diagram illustrating an example method for re-ranking of the content items on the intermediate landing page, according to some example embodiments.

FIG. 4 is a flow diagram illustrating an example method 400 for re-ranking of the content items on the intermediate landing page, according to example embodiments. The operations of the method 400 may be performed by components of the routing system 200. At operation 410, the relevance module 240 re-ranks the remaining content item on the intermediate landing page based on the extracted content. The relevance module 240 weigh the relevance of the remaining content item based on each remaining content item's relevance to the extracted content positioned at the top of the intermediate landing page. The content item include activities from database 132, 130, and 128 relating to social network activities of members including likes, comments, shared content. These social network activities are ranked according to their relevance with the extracted content positioned at the top and past user activities including user engagement, user search history, and the like. Further details associated with determine relevance of the remaining content item are discussed in association with FIG. 2.

In various embodiments, the remaining content item in the form of other item content being presented that is associated with activities of other members within the user's network) below the top positioned extracted content are re-ranked according to the relevance with the top extracted content. Referring to FIG. 6, the remaining content item include content item 675 of showing trends in big ideas and innovation, a short summary 680 of the content item 675 along with the associated image 670 and the corresponding social activities of total like 685 and total comment 690. The content item 675 and other content item not shown are ranked according to the extracted content 610. In this instance, the extracted content related to title 624 regarding newest calendar features using machine learning. The content item 675 is relevant to extracted content 610 since both are within the same category of big ideas and innovation, with content 675 being ranked higher than all other items since the total like 685 and total comment 690 include likes and comments from members within the user's social network.

At operation 420, in response to a selection of the extracted content, route the web browser to the web page. Referring back to FIG. 6, the user may select anywhere on the extracted article content (e.g., the image 620, the title 624, the first line 628 of the article) and be redirected to the original webpage associated with the selectable interface element hyperlink 560. When generating the extracted webpage content, the routing module 230 uses the URL of the hyperlink and link that to the generated extracted content in the intermediate landing page. In response to such a selection of the extracted content, the user is routed to the web page where the article is presented. As a result, the user still maintains the option to go directly to the full webpage by selecting the extracted content presented on the intermediate landing page if the user so desires. The rerouting to the intermediate landing page serves to present the extracted content in the context of surrounding social network activities, including activities that are within the first connection of the user. However, the user still has the option to be routed to the full webpage to see the full content, separated from the intermediate landing page if the user so desires.

FIG. 5 depicts an example device 500 (e.g., a mobile device) displaying an example user interface 510 for interactively sending a notification 520, according to some example embodiments. The notification 520 include shared activities by a member connected to the user, the shared activity in this instance being a shared article by the Matt Draper. Contents from the share article is presented to the user including an image 530 associated with the article, the title 540 and first few lines of the article 550. The notification 520 further includes a selectable interface element 560 which includes a hyperlink to view the webpage of the article that is being shared. The user may select the selectable interface element 560. In response, the routing module determines whether there are corresponding activities within the user's social network associated with the webpage of the hyperlink in selectable interface element 560. Where there are no determined corresponding activities, the user is taken directly to the webpage associated with the hyperlink. Where there are corresponding activities, the routing module 230 reroutes the web browser from the webpage associated with the hyperlink to an intermediate landing page. In some embodiments, the hyperlink has a first URL and the intermediate landing page has a second URL, such that the rerouting is a redirecting from the hyperlink to the intermediate landing page. Further details of the interaction of the user interface 510 is further described in detail in association with FIG. 3 and FIG. 4.

FIG. 6 depicts an example device 600 (e.g., a mobile device) displaying an example user interface including extracted content 610 and content item 675, according to some example embodiments. In response to the selection of selectable interface element 560 and a determination that the webpage associated with the hyperlink has corresponding social network activities, the social network activities being within the user's social network (e.g., these social network activities are activities by other members within the user's direct social network). The routing module 230 extracts content from the webpage associated with the hyperlink and causes presentation of the extracted content 610 which include the title 624, the first line of the article 628, image 620 and corresponding social network activities including a comment 615 of the connection Matt Draper when sharing the article, total like 630, total comment 640, and presented comment 650 of members directly within the user's network. The remaining content underneath the top extracted content 610 are ranked according to its relevance with the top extracted content 610, past user engagement, past user activities such as user searches, and the like. The remaining content include content item 675 with image 670, short summary 680 of the content item 675, corresponding network activities including total like 685 and total comment 690. It is noted, other content items can be presented but not shown in FIG. 6. Further details of the interaction of the user interface, extracted content 610, and content item 675 are further described in detail in association with FIG. 3 and FIG. 4.

Modules, Components, and Logic

Figure 7:
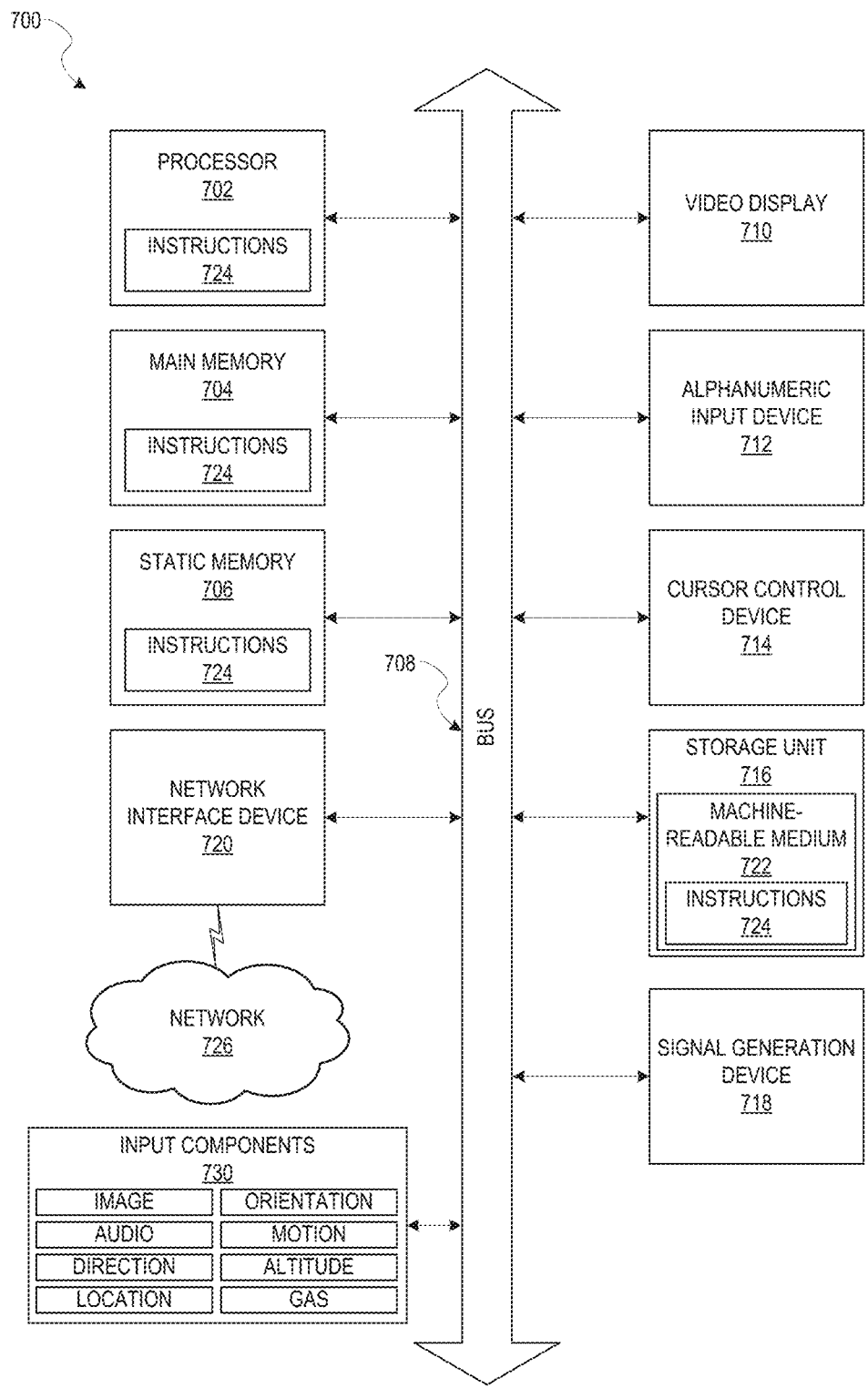
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 724 (e.g., software, a program, an application, an applet, an app, or other executable code) for causing the machine 700 to perform any one or more of the methodologies, associated with the routing system 200, discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Any of these machines can execute the operations associated with the routing system 200. Further, while only a single machine 700 is illustrated, the term "machine" shall also be taken to include a collection of machines 700 that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a video display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the static memory 706, within the processor 702 (e.g., within the processor's cache memory), or all three, during execution thereof by the machine 700. Accordingly, the main memory 704, static memory 706 and the processor 702 may be considered as machine-readable media 722. The instructions 724 may be transmitted or received over a network 726 via the network interface device 720.

In some example embodiments, the machine 700 may be a portable computing device, such as a smart phone or tablet computer, and have one or more additional input components 730 (e.g., sensors or gauges). Examples of such input components 730 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor) Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions 724. The term "machine-readable medium" shall also be taken to include any medium, or combination of multiple media, that is capable of storing instructions (e.g., instruction 724) for execution by a machine (e.g., machine 700), such that the instructions, when executed by one or more processors of the machine 700 (e.g., processor 702), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 722 is non-transitory in that it does not embody a propagating signal. However, labeling the machine-readable medium 722 as "non-transitory" should not be construed to mean that the medium is incapable of movement; the medium should be considered as being transportable from one physical location to another. Additionally, since the machine-readable medium 722 is tangible, the medium may be considered to be a machine-readable device.

The instructions 724 may further be transmitted or received over a communications network 726 using a transmission medium via the network interface device 720 and utilizing any one of a number of well-known transfer protocols (e.g., hypertext transfer protocol (HTTP)). Examples of communication networks include a local area network (LAN), a wide area network (WAN), the Internet, mobile telephone networks (e.g. 3GPP, 4G LTE, 3GPP2, GSM, UMTS/HSPA, WiMAX, and others defined by various standard setting organizations), plain old telephone service (POTS) networks, and wireless data networks (e.g., WiFi and BlueTooth networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 722 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 702, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions described herein. As used herein, "processor-implemented module" refers to a hardware module implemented using one or more processors 702.

Similarly, the methods described herein may be at least partially processor-implemented, with a processor 702 being an example of hardware. For example, at least some of the operations of a method may be performed by one or more processors 702 or processor-implemented modules. Moreover, the one or more processors 702 may also operate to support performance of the relevant operations in a "cloud computing" environment or as a "software as a service" (SaaS). For example, at least some of the operations may be performed by a group of computers (as examples of machines 700 including processors 702), with these operations being accessible via the network 726 (e.g., the Internet) and via one or more appropriate interfaces (e.g., an application program interface (API)).

The performance of certain of the operations may be distributed among the one or more processors 702, not only residing within a single machine 700, but deployed across a number of machines 700. In some example embodiments, the one or more processors 702 or processor-implemented modules may be located in a single geographic location (e.g., within a home environment, an office environment, or a server farm). In other example embodiments, the one or more processors 702 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifica-

What is claimed is:

1. A system comprising:
a processor, and a memory including instructions, which when executed by the processor, cause the processor to:
receive a document containing a hyperlink;
determine whether a webpage associated with the hyperlink has corresponding social network activities;
extract content from the webpage determined to have corresponding social network activities;
in response to a selection of the hyperlink, reroute a web browser to an intermediate landing page; and
cause presentation, at a user interface, of the extracted content and the corresponding social network activities.

2. The system of claim 1, wherein:
the extracted content is placed at the top position of the intermediate landing page.

3. The system of claim 1, wherein:
the hyperlink is associated with a first URL and the intermediate landing page is associated with a second URL.

4. The system of claim 1, wherein:
the social network activities are within the user's online social network.

5. The system of claim 1, wherein:
the re-ranking is further based on user past engagement.

6. The system of claim 1, wherein:
the extracted content is highlighted to differentiate the extracted content from the remaining content item on the intermediate landing page.

7. The system of claim 1, further comprising:
in response to a selection of the extracted content, routing the web browser from the intermediate landing page to the webpage.

8. A method comprising:
using one or more computer processors:
receiving a document containing a hyperlink;
determining whether a webpage associated with the hyperlink has corresponding social network activities;
extracting content from the webpage determined to have corresponding social network activities;
in response to a selection of the hyperlink, rerouting a web browser to an intermediate landing page; and
causing presentation, at a user interface, of the extracted content and the corresponding social network activities.

9. The method of claim 8, wherein:
the extracted content is placed at the top position of the intermediate landing page.

10. The method of claim 8, wherein:
the hyperlink is associated with a first URL and the intermediate landing page is associated with a second URL.

11. The method of claim 8, wherein:
the social network activities are within the user's online social network.

12. The method of claim 8, further comprising:
re-ranking remaining content items on the intermediate landing page based on relevance of the remaining content items to the extracted content at a top of the intermediate landing page.

13. The method of claim 12, wherein:
the extracted content is highlighted to differentiate the extracted content from the remaining content item on the intermediate landing page.

14. The method of claim 8, further comprising:
in response to a selection of the extracted content, routing the web browser from the intermediate landing page to the webpage.

15. A machine-readable medium not having any transitory signals and storing instructions that, when executed by at least one processor of a machine, cause the machine to perform operations comprising:
receiving a document containing a hyperlink;
determining whether a webpage associated with the hyperlink has corresponding social network activities;
extracting content from the webpage determined to have corresponding social network activities;
in response to a selection of the hyperlink, rerouting a web browser to an intermediate landing page; and
causing presentation, at a user interface, of the extracted content and the corresponding social network activities.

16. The machine-readable medium of claim 15, wherein:
the hyperlink is associated with a first URL and the intermediate landing page is associated with a second URL.

17. The machine-readable medium of claim 15, wherein the operations further comprise:
in response to a selection of the extracted content, routing the web browser from the intermediate landing page to the webpage.

18. The system of claim 1, wherein the instructions further cause the system to:
re-rank remaining content items on the intermediate landing page based on relevance of the remaining content items to the extracted content at a top of the intermediate landing page.

19. The method of claim 12, wherein:
the re-ranking is further based on user past engagement.

20. The machine-readable medium of claim 15, wherein the operations further comprise:
re-ranking remaining content items on the intermediate landing page based on relevance of the remaining content items to the extracted content at a top of the intermediate landing page.

* * * * *